United States Patent
Andreasch et al.

(10) Patent No.: US 8,498,037 B2
(45) Date of Patent: Jul. 30, 2013

(54) DYNAMIC REDIRECTION OF A LASER BEAM

(75) Inventors: Wolfgang Andreasch, Weinstadt (DE); Stefan Boeckmann, Murr (DE)

(73) Assignee: Trumpf Laser—und Systemtechnik GmbH, Ditzingen (DE)

( * ) Notice: Subject to any disclaimer, the term of this patent is extended or adjusted under 35 U.S.C. 154(b) by 28 days.

(21) Appl. No.: 12/914,200

(22) Filed: Oct. 28, 2010

(65) Prior Publication Data

US 2011/0116518 A1    May 19, 2011

Related U.S. Application Data

(63) Continuation of application No. PCT/EP2009/002694, filed on Apr. 11, 2009.

(30) Foreign Application Priority Data

May 2, 2008  (DE) .......................... 10 2008 022 014

(51) Int. Cl.
 *G02B 5/08* (2006.01)
 *G02B 7/182* (2006.01)
 *G02B 26/08* (2006.01)
 *B23K 26/067* (2006.01)
 *B23K 26/08* (2006.01)

(52) U.S. Cl.
 USPC .................. 359/212.1; 359/221.2; 359/223.1; 359/224.1; 359/225.1; 359/226.1; 359/845; 359/846; 359/849; 359/865; 359/900; 219/121.63; 219/121.64; 219/121.78; 219/121.79; 219/121.85

(58) Field of Classification Search
 USPC .......... 359/212.1, 212.2, 213.1, 214.1, 221.2, 359/223.1, 224.1, 225.1, 226.1, 849, 850, 359/865, 845, 226.2, 846, 900; 219/121.6, 219/121.63, 121.64, 121.74, 121.85, 121.75, 219/121.78, 121.79, 121.8
 See application file for complete search history.

(56) References Cited

U.S. PATENT DOCUMENTS

| | | | | |
|---|---|---|---|---|
| 1,898,791 A | * | 2/1933 | Schlumbohm | 359/636 |
| 3,609,485 A | * | 9/1971 | Dostal | 318/132 |
| 4,699,447 A | * | 10/1987 | Howard | 359/203.1 |

(Continued)

FOREIGN PATENT DOCUMENTS

| | | |
|---|---|---|
| DE | 10220324 A1 | 11/2003 |
| DE | 102004043895 A1 | 6/2005 |

(Continued)

OTHER PUBLICATIONS

Notification of Transmittal of Translation of the International Preliminary Report on Patentability from corresponding PCT Application No. PCT/EP2009/002694, mailed Nov. 18, 2010.

(Continued)

*Primary Examiner* — Ricky D Shafer
(74) *Attorney, Agent, or Firm* — Fish & Richardson P.C.

(57) ABSTRACT

A method for processing workpieces includes performing a laser processing operation in which a laser beam is directed at a first mirror face and at a second mirror face of a redirecting mirror. The second mirror face is at least partially surrounded by the first mirror face. During the laser processing operation, the second mirror face performs a pendulum movement relative to the first mirror face.

15 Claims, 2 Drawing Sheets

U.S. PATENT DOCUMENTS

| | | | | |
|---|---|---|---|---|
| 5,274,491 A | * | 12/1993 | Collins et al. | 359/200.1 |
| 5,303,081 A | | 4/1994 | Totsuka et al. | |
| 5,690,845 A | | 11/1997 | Fuse | |
| 5,726,433 A | * | 3/1998 | Peng | 235/462.36 |
| 5,984,159 A | * | 11/1999 | Ostendarp et al. | 225/93.5 |
| 6,305,809 B1 | * | 10/2001 | Zadro | 359/840 |
| 6,412,962 B1 | * | 7/2002 | Kaspar | 359/850 |
| 6,605,799 B2 | * | 8/2003 | Brandinger et al. | 219/121.74 |
| 6,696,008 B2 | * | 2/2004 | Brandinger | 264/400 |
| 6,809,290 B2 | * | 10/2004 | Gross et al. | 219/121.73 |
| 6,844,953 B2 | * | 1/2005 | Reboa | 359/226.3 |
| 6,958,837 B2 | * | 10/2005 | Hartwig | 359/213.1 |
| 7,486,425 B2 | * | 2/2009 | Shreeve et al. | 359/198.1 |
| 2005/0056626 A1 | | 3/2005 | Gross et al. | |
| 2006/0147841 A1 | * | 7/2006 | Ohmi et al. | 430/311 |

FOREIGN PATENT DOCUMENTS

| | | |
|---|---|---|
| EP | 0823304 A1 | 2/1998 |
| EP | 0865863 A1 | 9/1998 |
| GB | 1433563 | 4/1976 |
| JP | 60240395 | 11/1985 |
| JP | 01271088 | 10/1989 |
| JP | 2005314198 A | 11/2005 |
| WO | 03093903 A2 | 11/2003 |

OTHER PUBLICATIONS

International Search Report from corresponding PCT Application No. PCT/EP2009/002694, mailed Jul. 17, 2009, 2 pages.

* cited by examiner

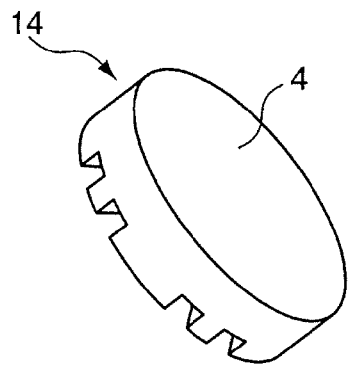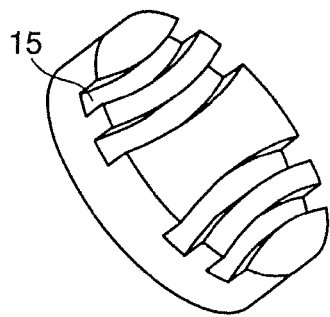
Fig. 3a  Fig. 3b
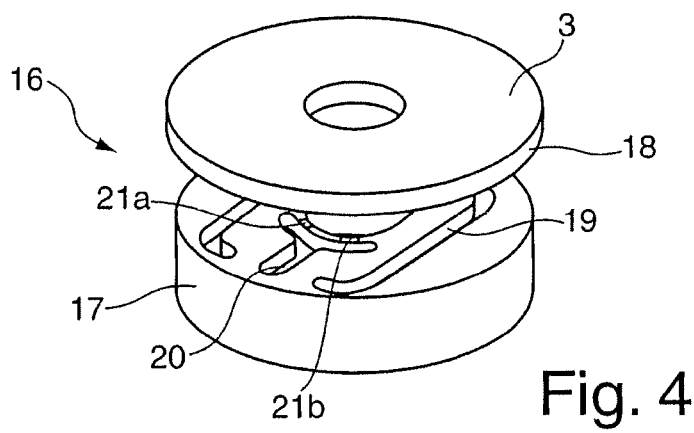
Fig. 4
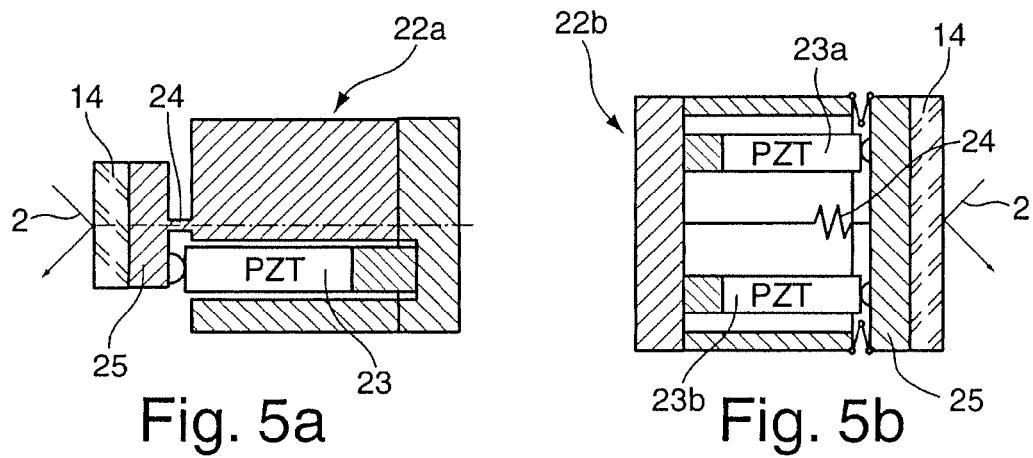
Fig. 5a  Fig. 5b

DYNAMIC REDIRECTION OF A LASER BEAM

CROSS-REFERENCE TO RELATED APPLICATIONS

This application is a continuation of and claims priority under 35 U.S.C. §120 to PCT/EP2009/002694, filed on Apr. 11, 2009, and designating the U.S., which claims priority under 35 U.S.C. §119 to German Patent Application No. 10 2008 022 014, filed on May 2, 2008. The contents of the prior applications are hereby incorporated by reference in their entirety.

TECHNICAL FIELD

The present invention relates to dynamic redirection of a laser beam.

BACKGROUND

The use of redirecting mirrors having several mirror faces, such as for laser processing, is known in a variety of forms, such redirecting mirrors being used for various purposes.

For example, JP 01271088 A describes a laser processing machine in which a phase difference between an outer and an inner portion of a laser beam is compensated for by changing the position of a movable inner mirror element of a redirecting mirror relative to an outer mirror element by means of a linearly movable mechanism provided for the purpose.

JP 2005314198 A discloses an apparatus in which, in order to optimize a laser cutting machine for glass cutting, the cross-sectional shape and the intensity distribution of the laser processing beam are adjusted by using a facet mirror having a plurality of mirror segments, the inclination of which is adjustable, or a variable-shape mirror in order to redirect the laser beam.

GB 1,433,563 also describes a laser processing machine for glass cutting in which a smaller mirror face is arranged upstream of a larger mirror face in the beam path of a laser beam. The two mirror faces can be driven by servo motors in order to redirect the laser beam onto two different focal points along a cutting line formed on the glass surface.

DE 10 2004 043 895 A1 describes a micro-processing method in which a plurality of beam steering elements, which can be positioned independently of one another, direct laser radiation received in a beam steering element arrangement onto selectable sites on a substrate. A number of laser beam focusing modules are associated with the beam steering elements in order to focus each partial beam on the substrate.

DE 102 20 324 A1 describes a concave mirror as a pupillary filter for a catadioptric projection lens, this mirror being arranged in the region of a pupillary face of the lens. The concave mirror is divided into a number of annular or honeycombed mirror segments which are movable independently of one another and relative to one another by means of piezoelectric drive elements. The mirror can be used as a phase-shifting pupillary filter, it being possible to adjust the filter function by displacing the mirror elements relative to one another by raising or lowering those mirror elements by means of piezo elements.

As a rule, the use of segmented redirecting mirrors in laser beam welding serves to produce a larger vapor channel (keyhole), as a result of which a larger melt bath volume is formed. The enlargement of the vapor channel can be effected, for example, by double-focus or tandem welding in which the laser beam is split, for example, by a roof mirror, into two partial beams which are then focused on two focal points lying close to one another. This enables the gases formed during the welding process to escape better at the surface, and therefore weak points in the weld seam caused by pore formation are minimized.

An optical system for double-focus welding has become known, for example, from EP 0 823 304 A1. In that document, the laser beam is split at a redirecting mirror into a plurality of partial beams having different optical axes. In one embodiment, the redirecting mirror is made up of an outer and an inner mirror element, the outer mirror element having a cylindrical central drilled hole into which the inner mirror element is fitted so that the inner and outer mirror elements are axially displaceable and rotatable relative to each other, as a result of which it is possible to adjust the relative position of a focal point, associated with the first or second partial beam, on two workpieces to be joined together. After adjusting the desired relative position of the focal points, the adjustment is set securely by fixing the mirror elements in position relative to each other.

A disadvantage of enlarging the vapor channel by double-focus welding lies in the required larger energy input per unit length compared with laser welding with only one focus. It is known from electron beam welding to swing the beam transversely to the weld joint at high frequency, that is to say, at frequencies of more than 2000 Hz, and at a pendulum amplitude of less than one millimeter, by means of a pendulum mirror. Also in one embodiment in EP 0 823 304 A1, a further mirror is provided for redirecting the partial beams, that mirror performing an oscillating movement so that the two focal points can perform a pendulum movement on the workpieces in a direction perpendicular to the welding line.

U.S. Pat. No. 5,690,845 also describes an optical arrangement for laser processing which has a first redirecting mirror as a device for splitting a laser beam into a plurality of partial beams. A second redirecting mirror, separated from the first, focuses the partial beams on a plurality of focal points. In one embodiment, the first redirecting mirror has two or more flat mirror portions which can be tilted independently of one another. In a further, alternative embodiment, the first redirecting mirror has a plurality of concave, convex or flat mirror faces arranged concentrically around the optical axis of the laser beam. The first redirecting mirror can in this case be tilted or rotated, in each case as a whole, in a predetermined direction in order to produce a pendulum or spiral movement of the focal points on the workpiece.

The dynamic redirection and movement of the laser beam in order to produce the pendulum movement is usually effected—as in the above examples—with the aid of so-called scanner mirrors, in the case of which the entire mirror face is rotated about an axis by means of a galvanometer drive. If such a mirror is to be used at a site in the beam path at which the laser beam has a large diameter, large, and therefore heavy, mirrors are required for the purpose. This limits the maximum possible pendulum frequency to values <<1500 Hz. Smaller mirrors, and therefore higher frequencies, are possible only if they are arranged in the convergent or divergent portion of a beam caustic in the vicinity of the beam waist, such as, for example, in systems having an intermediate focus, or in the vicinity of the end of an optical-fiber cable.

SUMMARY

In general, this invention related to dynamic redirection of a laser beam.

One aspect of the invention provides a method for processing workpieces that includes performing a laser processing operation in which a laser beam is directed at a first mirror face and a second mirror face of a redirecting mirror. The second mirror face is at least partially surrounded by the first mirror face. During the laser processing operation, the second mirror face performs a pendulum movement relative to the first mirror face.

The inventors have recognized that in order to produce the desired effect of enlarging the vapor channel (keyhole) it is sufficient if only a small section (second mirror face) of the entire mirror face of the redirecting mirror is swung highly dynamically, such as when the majority of the laser power impinges on that section. A laser beam portion reflected at the swinging second mirror face is subsequently focused on a focal point which performs a pendulum movement about a stationary focal point produced by the laser beam portion reflected at the first mirror face. The first mirror face can be immediately adjacent to the second mirror face in order, if possible, to redirect the entire laser power. For example, a small gap (e.g., approximately 0.02 mm wide), to allow the second mirror face to move relative to the first, may be left between the first and second mirror face.

It is also possible to provide two or more second mirror faces which permit highly dynamic redirection of the laser beam, any particular laser beam portion reflected by a dynamically moved mirror face typically being focused on its own focal point. The first mirror face also can be divided into several partial faces (facets). In the context of this application, a pendulum movement means a harmonic oscillation movement about a resting position.

In certain implementations, the first mirror face is stationary.

In some implementations, the second mirror face performs, relative to the first mirror face, a pendulum movement at a pendulum frequency of more than 2000 Hz, (e.g., more than 3000 Hz). In some cases, the second mirror face may be relatively small, for example 200 mm$^2$ or less, such that the mass of a mirror element on which the mirror face is formed can be small enough to reach high pendulum frequencies.

In certain implementations, the second mirror face performs a pendulum movement in the form of a tilting movement, a rotational movement and/or a linear movement, relative to the first mirror face. The production of the pendulum movement as a tilting movement has proved advantageous here, tilting typically taking place about one or two axes which extend in the plane of the first mirror face. The linear movement can take place perpendicularly to the first mirror face and, like the tilting movement, it can be converted by means of piezo actuators. In order to produce the tilting movement, the second mirror face, or a mirror element on which the second mirror face is formed, can be supported at a flexure hinge. Alternatively or additionally, a rotational movement of the second mirror face can also take place relative to the first mirror face, the rotational axis typically extending at an angle (other than 90°) relative to the second mirror face. If, for example, the second mirror face is arranged tilted with respect to the first and if rotation is effected about an axis perpendicular to the first mirror face, the laser beam can perform a circular movement on the workpiece. For example, an electrical motor can be used to produce the rotational movement.

In some implementations, the first mirror face and the second mirror face are arranged concentrically. For example, the first mirror face may be annular and the second mirror face is circular. The second, inner, mirror face on which the majority of the laser power (for example 86%) impinges, is in this case, can be swung in order to produce a swinging focal point with a high beam power during laser processing. The first, outer, mirror face can remain stationary and bring about a constant redirection of the laser beam (for example by 45°) onto a stationary focal point of lesser laser power (for example 14%). In some cases, not only circular mirror faces but also other, e.g., elliptical, shapes of the mirror faces may be used.

In certain implementations, the first mirror face is formed on a first mirror element and the second mirror face on a second mirror element. The first mirror element can be liquid-cooled and the second mirror element can be gas-cooled. With the high laser powers typically occurring in laser processing, it can be advantageous to cool the mirror elements in order to protect them from destruction and/or from deformation caused by excessively great changes in temperature. For example, the second mirror element can be gas-cooled (for example with nitrogen or air) since cooling with a liquid may reduce the pendulum frequency owing to the additional mass.

In some implementations, a proportion of more than 80% of the intensity of the laser beam is redirected at the second mirror face. When the beam portions reflected by the first and the second mirror face are subsequently focused, a high-power swinging focal point can be produced which swings about a fixed focal point with a lower beam intensity, which can be favorable for laser processing. The relative portions of the laser power which impinge on the first or second mirror face can be adjusted by changing the beam diameter of the laser beam impinging on the redirecting mirror.

A further aspect of the invention provides a laser beam redirecting mirror that includes a first mirror face and a second mirror face that is at least partially surrounded by the first mirror face. The second mirror face is supported such that it can be swung relative to the first mirror face at pendulum frequencies of more than 2000 Hz.

In certain implementations, the laser beam redirecting mirror has a drive device for producing the pendulum movement of the second mirror face relative to the first mirror face. The laser beam redirecting mirror can be used for laser processing to permit a high-frequency pendulum movement of a laser beam focus on the workpiece(s) to be processed.

In some implementations, the drive device is configured to produce a pendulum movement in the form of a tilting movement, rotational movement and/or linear movement of the second mirror face relative to the first mirror face. As set out above, the pendulum movement can be produced in various manners, it also being possible, for two pendulum movements to be superimposed on one another, for example by effecting a superimposed tilting movement about two mutually perpendicular tilting axes, e.g., to achieve a spiral movement of the focal point, as shown in U.S. Pat. No. 5,690,845 which was mentioned above and which is incorporated by reference in this application.

In certain implementations, the drive device has at least one piezo actuator for producing the pendulum movement. A tilting movement and/or a linear movement of the second mirror face at a high pendulum frequency can also be produced using piezo actuators.

In some implementations, the first mirror face is formed on a first mirror element and the second mirror face is formed on a second mirror element. In some cases, the first mirror element is supported in a stationary manner and has a feed device for feeding a cooling gas to the second mirror element. For example, nozzles may be provided as feed devices in the first mirror element.

In certain implementations, the first mirror face is formed on a plate-shaped element which is placed on a base body of the first mirror element. Cooling channels for the passage of a cooling liquid and/or further cooling channels for the passage of a cooling gas for the second mirror element can be incorporated in the base body. The base body may be manufactured from a steel alloy, which can provide the base body with a high degree of stability and, as a result, a low degree of deformation of the mirror face. The plate-shaped mirror face can be composed of copper or aluminum. The base body and the mirror face can be connected to each other, for example, by soldering or adhesive bonding. Water which flows, for example, through an annular groove in the base body can be used to cool the first mirror element. The division of the first mirror element into a base body and a plate-shaped element with the mirror face may be advantageous in that the cooling media can be guided closely along the mirror surface.

In some implementations, the second mirror face is formed on a second, movably supported, mirror element. The second mirror element can be one-piece. The second mirror element may be supported at one or more flexure hinges in order to permit the pendulum movement.

In certain implementations, the second mirror element includes grooves for the passage of a cooling gas are incorporated in the second mirror element. The second mirror element can be metallic. For example, the second mirror element can be composed of copper or aluminum. Since the second mirror element may be exposed to a high radiation power, it can be cooled, e.g., by a gas that is guided through grooves milled into the second mirror element. For better heat exchange, the grooves may be configured in a banana shape.

A further aspect of the invention provides a laser processing head for guiding a laser beam onto a workpiece. The laser processing head includes a redirecting mirror as described above, and a focusing device for the laser beam. The focusing device is arranged in the laser processing head. A laser processing head having such a redirecting mirror is configured to focus the laser beam on two or more focal points, of which at least one performs a pendulum movement during laser processing.

In certain implementations, the redirecting mirror is arranged in the beam path upstream or downstream of the focusing device or is in the form of a focusing device. If the redirecting mirror is arranged in the convergent beam path downstream of the focusing device, the second mirror face, which is to be swung, can be reduced in size, as a result of which the pendulum frequency can be selected to be higher. However, the redirecting mirror can also itself act as a focusing device when it is configured, for example, as a hollow mirror.

Further advantages of the invention will emerge from the description and drawings. Likewise, the features mentioned above and those set forth hereinafter may be used individually or a plurality thereof may be used in any desired combination. The embodiments shown and described are not to be understood as a definitive list but, rather, are exemplary in nature in order to describe the invention.

DESCRIPTION OF DRAWINGS

FIGS. 1b and 1c are schematic side views of the redirecting mirror of FIG. 1a.

FIGS. 3a-3b are perspective views of an inner mirror element of the redirecting mirror of FIG. 1a.

FIG. 4 is a perspective view of an outer mirror element of the redirecting mirror of FIG. 1a.

FIGS. 5a-b are schematic views of examples of a support for the inner mirror element of the redirecting mirror.

DETAILED DESCRIPTION

Figure 1A:
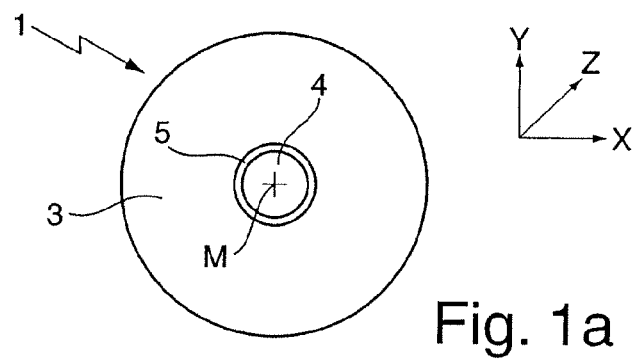
FIG. 1a is a schematic plan view of a redirecting mirror.
Figure 1B:
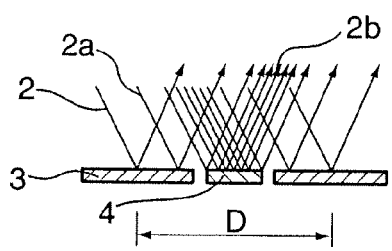
Figure 1C:
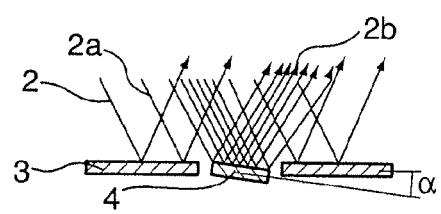

FIGS. 1a-c show a redirecting mirror 1 for a laser beam 2 whose circular mirror face is divided into a first, outer, mirror face 3 and a second, inner, mirror face 4. A beam diameter D of the laser beam 2 can be selected so that the laser beam 2 is reflected completely at the two mirror faces 3, 4. The first and second mirror faces 3, 4 are arranged concentrically and are separated from one another only by a narrow gap 5 so that almost 100% of the intensity of the laser beam 2 is reflected at the redirecting mirror 1. The second, circular, mirror face 4 is supported in a movable manner and the first, annular, mirror face 3 is supported in a stationary manner. The support of the second mirror face 4 can perform a pendulum movement in the form of a tilting movement along an axis that extends through the middle point M of the second mirror face 4 or through a point on an axis extending through the middle point M perpendicularly to the second mirror face 4 and which also extends parallel with the plane of the first mirror face 3. The direction of that tilting axis corresponds to the direction of an X axis or Y axis of an XYZ coordinate system shown in FIG. 1a.

As shown in FIGS. 1b and 1c, the second mirror face 4 can be moved from a starting position in which it lies in the same plane as the first mirror face 3, as shown in FIG. 1b, into a tilted position, as shown in FIG. 1c, the maximum tilt angle α typically being ±1.1 mrad. The gap 5 between the first and second mirror faces 3, 4 has a width which is so selected that the second mirror face 4 can be tilted through that maximum tilt angle relative to the first mirror face 3. With the above-indicated choice of maximum tilt angle, that gap width is at least approximately 0.02 mm.

The beam cross-section D of the incident laser beam 2 is adjusted to the size of the mirror faces 3, 4 and is in a form such that (for example) a second partial beam 2b is reflected with 86% of the laser power by the second mirror face 4 in order to perform a pendulum movement therewith. In order to be able to use the remaining 14% of the laser power, the annular first mirror face 3 is arranged around the second mirror face 4. A first partial beam 2a of the laser beam 2 is reflected by the first mirror face 3 and forms with the incident laser beam 2 a constant angle of, for example, 45° in the XY plane (redirecting plane).

The type of beam-splitting described above has the advantage that high pendulum frequencies can be produced with the small second mirror face 4 and that, owing to the provision of the first mirror face 3 surrounding the second mirror face 4, almost no laser power is wasted. The second mirror face 4 can here have a diameter of, for example, less than 15.8 mm, so that the swung second mirror face 4 is small enough for pendulum frequencies of more than 3000 Hz to be achieved therewith. It is also possible to radiate more or less power onto the swung second mirror face 4 by changing the diameter D of the laser beam 2. For example, more than half of the laser power present can be swung even with a very small second mirror face 4 since the intensity distribution of the laser radiation over the beam cross-section corresponds substantially to a Gaussian distribution where a considerable portion of the beam intensity is concentrated in the vicinity of the middle point M of the second mirror face 4.

Figures 2A, 2B:
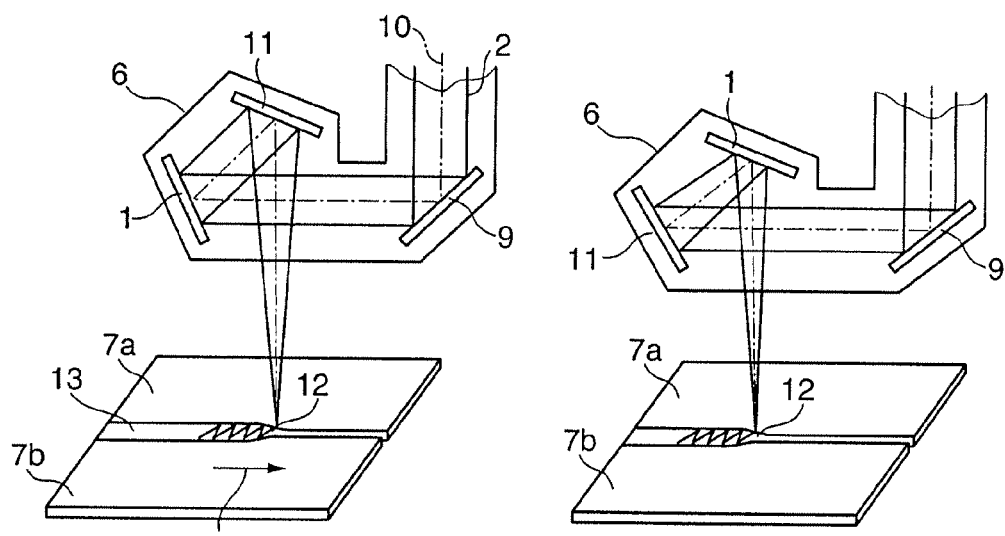
FIG. 2a is a schematic view of a laser processing head having a redirecting mirror in a first arrangement.
FIG. 2b is a schematic view of a laser processing head having a redirecting mirror in a second arrangement.

FIG. 2a shows a first variant of a laser processing head 6 in which the redirecting mirror 1 of FIGS. 1a-c is installed in order to carry out a laser processing operation for connecting two workpiece parts 7a and 7b in a processing direction 8.

The laser processing head 6 has a first redirecting mirror 9 for redirecting the collimated laser beam 2 coming from a beam guide device. The redirected laser beam 2 subsequently impinges on the redirecting mirror 1 of FIGS. 1*a*-*c* and is split by that mirror 1 into two partial beams 2*a* and 2*b*, which, for the sake of simplicity, are represented in FIG. 2*a* by a single beam 2. The redirecting mirror 1 is arranged in such a manner that its middle point M comes to lie on the optical axis 10 of the laser beam 2. Arranged in the beam path downstream of the redirecting mirror 1 is a focusing mirror 11 by which the partial beams 2*a* and 2*b* are focused on a processing zone 12 which is located between the workpiece parts 7*a* and 7*b* and behind which a weld seam 13 is formed in the processing direction 8.

As a result of the focusing of the partial beams, two focal points are produced in the processing zone 12. The more powerful focus (for example with 86% of the laser power) is swung about the fixed focus (for example with 14% of the laser power), for example, with a maximum displacement of 0.6 mm perpendicular to the processing direction 8, as indicated in FIG. 2*a* by a serrated line. As a rule, the pendulum frequency is kept constant during laser processing but it can also be varied if desired.

The variant shown in FIG. 2*b* of the arrangement of the redirecting mirror 1 in the laser processing head 6 differs from the variant described in connection with FIG. 2*a* only in that the positions of the redirecting mirror 1 and of the focusing mirror 11, which redirects the laser beam 2 through 45°, are exchanged. The redirecting mirror 1 is therefore arranged in the partially focused beam path and redirects the partially focused laser beam 2 through a further 45° relative to the processing zone 12. In this variant, the diameter of the redirecting mirror 1 can therefore be selected to be smaller than in the variant described in connection with FIG. 2*a*, which is why higher pendulum frequencies can typically be achieved in this variant.

An example of the structure of the redirecting mirror 1 for achieving high pendulum frequencies is presented hereinafter with reference to FIGS. 3 to 5. FIGS. 3*a* and 3*b* show a second mirror element 14 on whose upper side the second mirror face 4 is formed. The second mirror element 14 can be composed of a metallic material (copper, aluminum, etc.) which can assist with cooling of the second mirror element 14. Cooling of the second mirror element 14 can be important owing to the high beam powers. For that purpose, grooves are milled into the underside of the second mirror element 14 as cooling channels 15 which are configured in a banana shape for better heat exchange. A cooling gas (e.g., air, nitrogen, etc.) is conveyed through the cooling channels 15 since the use of a cooling liquid would have detrimental effects on the pendulum frequency of the second mirror element 14 owing to the additional mass to be moved and owing to the damping effect of hoses and connections. The substantially plate-shaped second mirror element 14 has in this case a mass of typically less than 5 grams.

FIG. 4 shows a first mirror element 16 in which an annular plate-shaped element 18 of copper, whose upper side forms the first mirror face 3, is formed on a base body 17 composed of a steel alloy, the base body 17 and the plate-shaped element 18 being connected to each other, for example, by soldering. Water which is conveyed through a substantially annular groove acting as a cooling channel 19 is used to cool the first mirror element 16. A further cooling channel 20 is used for the passage of a cooling gas to nozzles 21*a* and 21*b* which act as feed devices for feeding the cooling gas to the cooling channels 15 of the second mirror element 14 and which are likewise milled into the base body 17. It will be appreciated that further cooling channels are incorporated in the base body 17 in order to convey the cooling gas away. Owing to the division of the first mirror element 16 into the base body 17 and the plate-shaped element 18, the cooling media can be guided closely along the mirror surface 3.

In order to achieve a high movement frequency of the second mirror face 4, or of the second mirror element 14, the latter is, as shown in FIG. 5*a*, mounted on a piezo tilting system 22*a* acting as a drive device, in such a manner that it is supported tiltably about an axis parallel with the first mirror face 3. The second mirror element 14 is in this case arranged on a carrier element 25. A piezo actuator 23 is integrated in the tilting system 22*a* and enables the second mirror element 14, which is supported at a flexure hinge 24, to be driven. In an alternative embodiment, shown in FIG. 5*b*, of a piezo tilting system 22*b* acting as a drive device, four piezo actuators are present, of which two piezo actuators 23*a* and 23*b* are shown in FIG. 5*b*, and permit a tilting of the second mirror element 14 in the Z direction. Two further piezo actuators permit tilting about an axis perpendicular to the plane of the drawing (X axis, cf. FIG. 1*a*) so that the second mirror element 14 can be tilted in all directions. The flexure hinge 24 is configured to be resilient, so that, by simultaneously controlling all of the piezo actuators at the same voltage, a linear movement of the second mirror element 14 can be achieved. It will be appreciated that, as an alternative to the forms of movement described here, for example a rotational movement of the second mirror face 4 relative to the first mirror face 3 may also be effected, for example by means of an electrical motor.

It will also be appreciated that the redirecting mirror 1 does not necessarily have to have round mirror faces 3, 4 but that another configuration, for example an elliptical shape, may also be chosen for the mirror faces. Nor is it necessary for the redirecting mirror to be in the form of a flat mirror; rather, the mirror faces 3, 4 may also be curved (for example elliptically, parabolically). In that case, the redirecting mirror can also be used as a focusing mirror.

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing workpieces, the method comprising:
   performing a laser processing operation in which a laser beam is directed at a first mirror face and at a second mirror face of a redirecting mirror, the second mirror face being completely surrounded by the first mirror face,
   providing, at the first mirror face which is supported in a stationary manner, a constant redirection of a first partial beam having a first fraction of a laser power of the laser beam impinging on the redirecting mirror, wherein, during the laser processing operation, a drive device produces, from a starting position in which the second mirror face lies in a same plane as the first mirror face, a pendulum movement of the second mirror face at a pendulum frequency of more than 2000 Hz relative to the first mirror face for redirecting a second partial beam having a second fraction of the laser power of the laser beam impinging on the redirecting mirror to produce a pendulum movement of the second partial beam relative to the first partial beam.

2. The method of claim 1, wherein the second mirror face performs the pendulum movement in a form of a tilting movement, a rotational movement or a linear movement, relative to the first mirror face.

3. The method of claim 1, wherein the first mirror face and the second mirror face are arranged concentrically.

4. The method of claim 3, wherein the first mirror face is annular and the second mirror is circular.

5. The method of claim 1, wherein the first mirror face is formed on a first mirror element and the second mirror face on a second mirror element, the first mirror element being liquid-cooled and the second mirror element being gas-cooled.

6. The method of claim 1, wherein a proportion of more than 80% of the intensity of the laser beam is redirected at the second mirror face.

7. A laser beam redirecting mirror for laser processing, comprising:
   a first mirror face supported in a stationary manner for bringing about a constant redirection of a first partial beam having a first fraction of a laser power of a laser beam impinging on the redirecting mirror;
   a second mirror face completely surrounded by the first mirror face,
   wherein the second mirror face is supported such that it can be moved relative to the first mirror face in a pendulum movement from a starting position in which the second mirror face lies in a same plane as the first mirror face for redirecting a second partial beam having a second fraction of the laser power of the laser beam impinging on the redirecting mirror; and
   a drive device configured to produce the pendulum movement of the second mirror face relative to the first mirror face at a pendulum frequency of more than 2000 Hz for producing a pendulum movement of the second partial beam relative to the first partial beam.

8. The laser beam redirecting mirror of claim 7, wherein the drive device is configured to produce the pendulum movement of the second mirror face in a form of a tilting movement, rotational movement or linear movement of the second mirror face, relative to the first mirror face.

9. The laser beam redirecting mirror of claim 7, wherein the drive device has at least one piezo actuator for producing the pendulum movement of the second mirror face.

10. The laser beam redirecting mirror of claim 7, wherein the first mirror face is formed on a first mirror element and the second mirror face is formed in a second mirror element, wherein the first mirror element is supported in a stationary manner, and wherein the first mirror element has a feed device for feeding a cooling gas to the second mirror element.

11. The laser beam redirecting mirror of claim 10, wherein the first mirror element comprises:
   a base body comprising cooling channels for passage of a cooling liquid or a cooling gas; and
   a plate shaped element disposed on the base body, and wherein the first mirror face is formed on the plate-shaped element.

12. The laser beam redirecting mirror of claim 11, wherein the second mirror face is formed on a second, movably supported mirror element.

13. The laser beam redirecting mirror of claim 12, wherein the second mirror element comprises grooves for the passage of a cooling gas.

14. A laser processing head for guiding a laser beam onto a workpiece, comprising:
   the laser beam redirecting mirror of claim 7; and
   a focusing device for the laser beam.

15. The laser processing head of claim 14, wherein the redirecting mirror is arranged in a beam path upstream or downstream of the focusing device or is in a form of a focusing device.

* * * * *